United States Patent
Zummach et al.

(10) Patent No.: US 9,687,897 B2
(45) Date of Patent: Jun. 27, 2017

(54) APPARATUS AND METHOD FOR IMPRESSING A CORRUGATION INTO A PIPE

(71) Applicant: NEXANS, Paris (FR)

(72) Inventors: Volker Zummach, Alfeld (DE); Thomas Krause, Bad Nenndorf (DE); Anatoli Schmidt, Hannover (DE); Adrian Harms, Hannover (DE)

(73) Assignee: NEXANS, Paris (FR)

( * ) Notice: Subject to any disclaimer, the term of this patent is extended or adjusted under 35 U.S.C. 154(b) by 256 days.

(21) Appl. No.: 14/306,795

(22) Filed: Jun. 17, 2014

(65) Prior Publication Data

US 2015/0013407 A1   Jan. 15, 2015

(30) Foreign Application Priority Data

Jul. 4, 2013   (EP) .................................. 13175025

(51) Int. Cl.
 *B21D 15/06* (2006.01)
 *G01H 1/00* (2006.01)
 *B21D 15/04* (2006.01)

(52) U.S. Cl.
 CPC ............. *B21D 15/06* (2013.01); *B21D 15/04* (2013.01); *G01H 1/003* (2013.01)

(58) Field of Classification Search
 CPC ........ B21D 15/06; B21D 15/04; B21D 15/00; F16F 15/00; F16F 7/122; G01H 1/003
 See application file for complete search history.

(56) References Cited

U.S. PATENT DOCUMENTS

| 6,405,919 B2* | 6/2002 | Frohne | B21C 37/08 228/15.1 |
| 8,224,492 B2* | 7/2012 | Lakomiak | G01H 1/003 340/683 |
| 8,478,548 B2* | 7/2013 | Hudson | G01H 1/003 702/184 |

(Continued)

FOREIGN PATENT DOCUMENTS

JP   H08267153   10/1996

OTHER PUBLICATIONS

International Search Report dated Nov. 15, 2013.

*Primary Examiner* — Moshe Wilensky
*Assistant Examiner* — Mohammad Yusuf
(74) *Attorney, Agent, or Firm* — Sofer & Haroun, LLP

(57) ABSTRACT

An apparatus has a corrugating device through which a pipe is moved producing corrugation in the circumferential direction of the pipe by rotation. The corrugating device has a corrugator head which is rotatable about its axis, and a hollow shaft on which the corrugator head is firmly fitted and via which the corrugator head is driveable in rotation. A vibration measuring means is connected mechanically to the corrugating device for automatically detecting mechanical vibrations of the rotating corrugating device. The vibration measuring means simultaneously detects measured values for vibrations of the hollow shaft which are characteristic of the state of the hollow shaft bearings and measured values for vibrations of the corrugator head which are characteristic of the balancing thereof. A display apparatus displays the measured values detected thereby and/or evaluation results based on the measured values is furthermore provided.

3 Claims, 2 Drawing Sheets

(56) References Cited

U.S. PATENT DOCUMENTS

| | | | |
|---|---|---|---|
| 8,631,672 B2* | 1/2014 | Unger | B21D 15/04 |
| | | | 72/112 |
| 8,803,698 B1* | 8/2014 | Heydron | G01H 1/003 |
| | | | 340/683 |
| 2002/0178773 A1 | 12/2002 | Doherty | |
| 2011/0132053 A1 | 6/2011 | Unger et al. | |

* cited by examiner

APPARATUS AND METHOD FOR IMPRESSING A CORRUGATION INTO A PIPE

RELATED APPLICATION

This application claims the benefit of priority from European Patent Application No. 13 175 025.9, filed on Jul. 4, 2013, the entirety of which is incorporated by reference.

BACKGROUND

Field of the Invention

The invention relates to an apparatus for impressing a corrugation into a metallic smooth pipe, said apparatus having a corrugating device which is driveable in rotation, through which the pipe is moved in its longitudinal direction and which produces the corrugation in the circumferential direction of the pipe by rotation, wherein the corrugating device has a corrugator head which is rotatable about its axis, and a hollow shaft on which the corrugator head is firmly fitted and via which the corrugator head is driveable in rotation, and also to a method for producing the corrugation.

Description of Related Art

An apparatus for manufacturing corrugated pipes is described for example in EP 1 084 774 B1. It is used for manufacturing metal pipes that are flexible on account of their corrugation. The corrugated metal pipes are for example used in the cable industry as electrical conductors of high-frequency cables or as a covering for electrical and optical cables, or they are used for transporting gases or liquids.

In the abovementioned known apparatus according to EP 1 084 774 B1, a pipe is formed from a longitudinally entering metal strip which is welded at a longitudinal slit. The obtained smooth pipe is then corrugated transversely to its longitudinal, direction in a corrugating device which the pipe runs through in its longitudinal direction. The corrugating device consists of a corrugator head in which a corrugator disk is rotatably mounted, said corrugator disk impressing the corrugation into the pipe upon operation of the corrugating device. The corrugator head is set into rotary movement by a hollow shaft on which the corrugator head is firmly fitted, by means of an electric motor. For the quality of the corrugation and a consistently efficient corrugating device, a uniformly and concentrically rotating corrugator head is crucial.

The rotation of the corrugator head, and thus of the corrugator disk, is influenced in particular by the quality of balancing of the corrugator head and by the state of the bearings of the hollow shaft. When the corrugator head is set up, the position of the corrugator disk that is mounted in a radially displaceable manner is selected such that the corrugation depth of the corrugated pipe to be produced corresponds to the desired value. The radial displacement of the corrugator disk together with its mount makes it necessary to balance the corrugator head with counterweights. A poorly balanced corrugator head can be recognized for example by the operator of the apparatus from more or less highly pronounced mechanical vibrations thereof. These vibrations can result in considerable damage to the hollow shaft bearings or to bearings of the corrugator head. Similarly, worn hollow shaft bearings contribute to a worsening in the rotary movement of the hollow shaft and thus of the corrugator head, and this can be manifested by a worsening in the quality of the flexible metal pipe.

OBJECTS AND SUMMARY

The invention is based on the object of improving the apparatus and the method for impressing the corrugation into a pipe such that a consistently uniform rotation can be ensured without said mechanical vibration, which has a negative impact, of the corrugating device.

This object is achieved according to the invention in that a vibration measuring means is furthermore fitted on the apparatus, said vibration measuring means being connected mechanically to the corrugating device and being suitable for automatically detecting mechanical vibrations of the rotating corrugating device, in that the vibration measuring means is suitable for simultaneously detecting measured values for vibrations of the hollow shaft which are characteristic of the state of the hollow shaft bearings and measured values for vibrations of the corrugator head which are characteristic of the balancing thereof, and in that a display apparatus, coupled to the vibration measuring means, for displaying the measured values detected thereby and/or evaluation results based on the measured values is provided.

The detected measured values are evaluated by way of a suitable evaluation or monitoring unit which is coupled to the vibration sensor.

The measurement signals can also be processed further for further use by means of a data-processing installation.

By way of the vibration meter and the display apparatus coupled thereto, the operator of the apparatus is automatically notified when disruptive vibrations impair the rotation of the corrugator head. Conclusions can be drawn, for example from a frequency spectrum of measured values which the vibration meter supplies, as to the nature and the origin of the undesired vibrations. For example, vibrations caused by the unbalance of the corrugator head can be distinguished easily from vibrations caused by worn hollow shaft bearings. As a result, it is possible for the operator to counteract excessive vibrations in a targeted manner by readjusting for example the balancing weights on the corrugator head in order to remedy any unbalance. Since the wear to the hollow shaft bearings can be detected early from its vibration characteristics by vibration analysis, the operator can furthermore expediently replace the hollow shaft bearings with new ones when the apparatus is not currently in operation. As a result, an interruption to ongoing production can be avoided and so no unusable lengths of the corrugated pipe arise. In particular, the service life or useful life of the hollow shaft bearings and the bearings of the corrugator head can advantageously be optimized or extended since the bearings are not only protected by the avoidance of vibrations but also only have to be replaced when necessary.

BRIEF DESCRIPTION OF DRAWING

Exemplary embodiments of the subject matter of the invention are illustrated in the drawings, in which.

DETAILED DESCRIPTION

Figure 1:
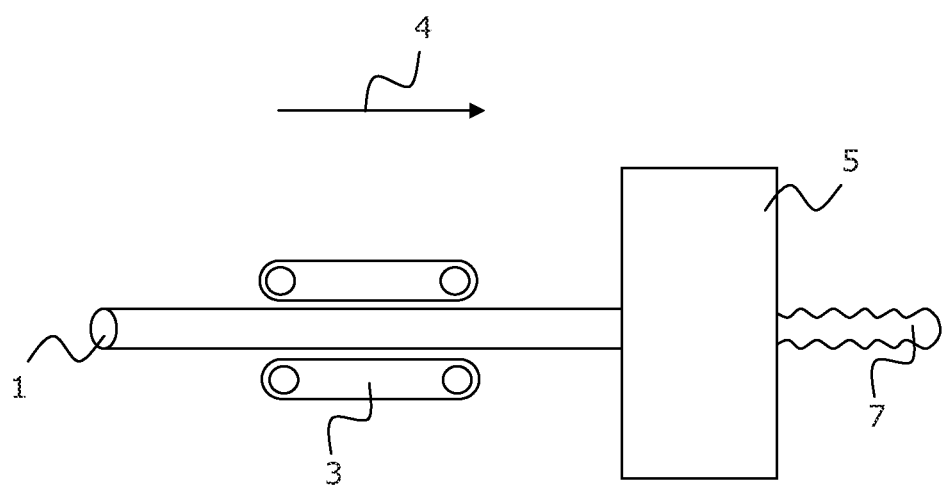
FIG. 1 schematically illustrates an arrangement for impressing a corrugation into a smooth pipe.

By means of the arrangement illustrated schematically in FIG. 1, a corrugation is impressed into a smooth metallic pipe 1. The pipe can be manufactured in accordance with a known method, as described for example in EP 1 084 774 B1 mentioned at the beginning. The pipe can consist for example of steel, copper or aluminum.

In the exemplary embodiment illustrated, the smooth pipe 1 is pushed by means of a take-off apparatus 3 in the direction of the arrow 4 through an apparatus 5 according to the invention, in which the smooth pipe 1 is provided with an annularly or spirally configured corrugation. The corrugated pipe 7 can then be wound onto a reel (not illustrated).

Figure 2:
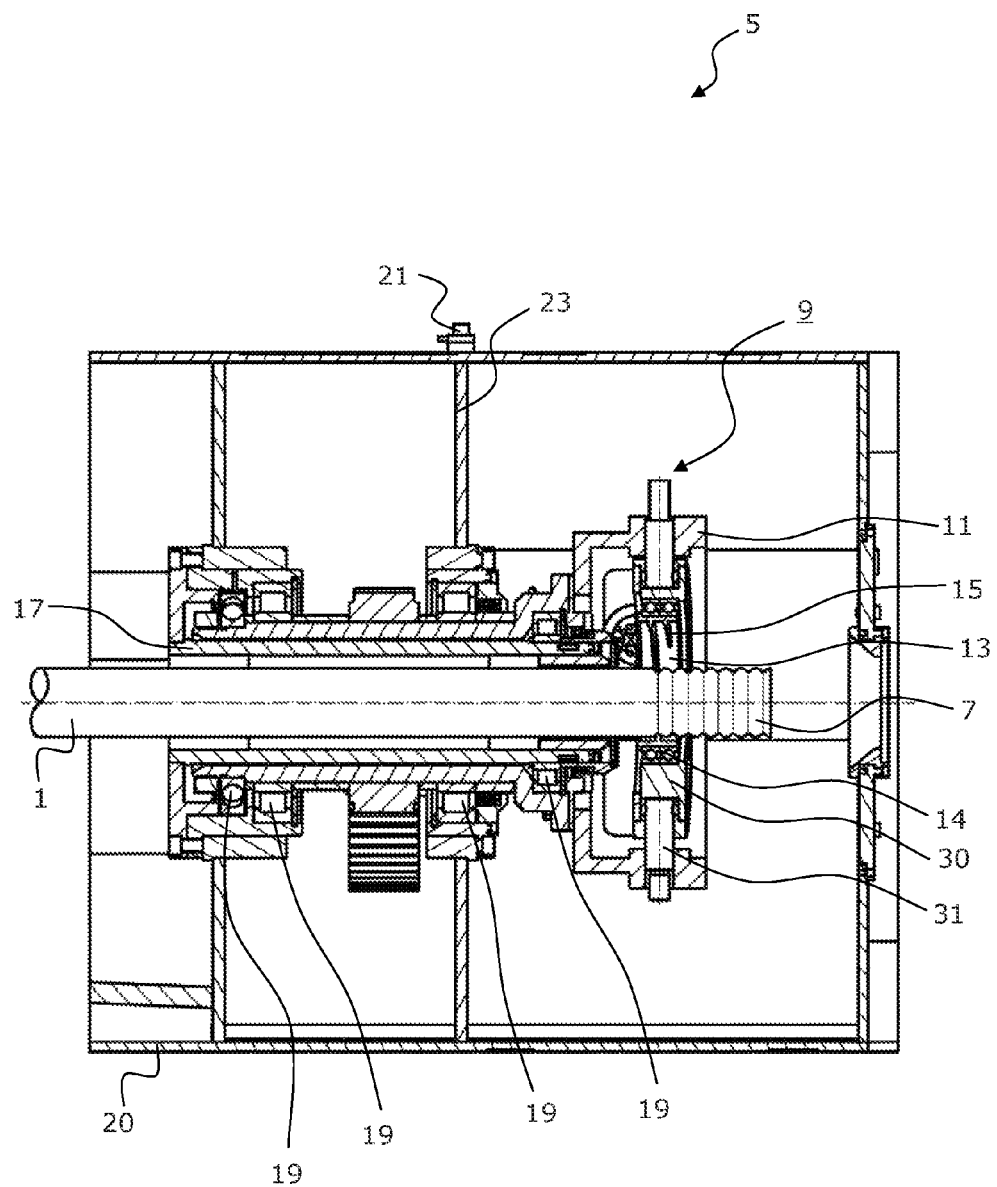
FIG. 2 shows an enlarged illustration of an apparatus according to the invention which is usable in the arrangement according to FIG. 1.

In FIG. 2, the apparatus 5 according to the invention is illustrated in more detail. It comprises a corrugating device 9 that is known in principle. The corrugating device 9 consists of a corrugator head 11 and a corrugator disk 13. The corrugator head 11 is embodied as an annular disk in the central opening of which the corrugator disk 13 is mounted so as to be rotatable about its axis. The corrugator disk 13 can be mounted in the corrugator head 11 for example on ball bearings 14 which are located in a bearing housing 30. In the exemplary embodiment illustrated, the corrugator disk 13 has an inwardly directed, spiral-shaped deformation rib 15 by means of which an annular corrugation is impressed into the pipe 1 while the corrugator disk 13 rotates about the pipe. If the corrugation is intended to be spiral-shaped, the deformation rib is embodied in an annular manner.

The corrugator disk 13 is displaceable radially together with the bearing 14 and bearing housing 30 via a displacement axis 31. As a result of the eccentric positioning of the corrugator disk by way of the displacement possibility, the corrugation depth of the pipe to be corrugated can be influenced. This eccentricity is compensated by compensation weights (not illustrated) which are fastened to the corrugator head 11, and thus the unbalance of the corrugator head 11 is reduced.

The corrugator head 11 is flanged onto a hollow shaft 17 which is driven for example by an electric motor by way of which the corrugator head 11 can be set into rotation. The hollow shaft 17 is mounted in a rotatable manner in a stationary housing 20 by means of hollow shaft bearings 19.

During operation of the apparatus 5, the corrugator head 11 and the corrugator disk 13 carried along by the latter are rotated in the circumferential direction about the smooth pipe 1, wherein the deformation rib 15 presses the corrugation into the pipe 1. In the process, the pipe 1 is simultaneously pushed in the direction of the arrow 4 through the corrugating device 9.

According to the invention, the apparatus 5 furthermore comprises a vibration meter 21, for example an acceleration meter. The vibration meter 21 detects vibrations of the corrugating device 5 during operation thereof. The measured vibrations are in particular characteristic of the unbalance of the corrugator head 11 and of the state of the hollow shaft bearings 19.

In the exemplary embodiment shown, the vibration meter 21 is fitted on the outside of the housing 20 of the apparatus 5 in the immediate vicinity of a connecting rib 23, i.e. in the direction of the axis thereof, said connecting rib 23 connecting the hollow shaft bearings 19 to the housing 20. As a result of this direct mechanical connection of the vibration meter 21 to the corrugator head 11 and to the hollow shaft 17, the vibrations can be detected readily and without excessive damping losses by the vibration meter 21.

The vibration measured values detected by the vibration meter 21 can be evaluated for example by way of an evaluation or monitoring unit which is not explained in more detail. As a result it is possible to monitor whether the corrugating device is operational. By way of the evaluation results or starting values, the operator is informed for example as to whether the corrugator head is sufficiently balanced and/or whether the hollow shaft bearings are worn.

According to the invention, the apparatus 5 furthermore comprises a display apparatus (not illustrated), coupled to the vibration measuring means 21, for displaying the measured values detected thereby. The display apparatus can display the measured values that are directly measured or the already evaluated measured values, for example as a frequency spectrum.

The display apparatus can also contain for example a traffic light function in the form of colored lights. In the case of green light, the operator is informed that the corrugator head 11 is sufficiently balanced. In the case of yellow light, the apparatus 5 can remain in operation, but the corrugator head 11 ought to be balanced. In the case of red light, the corrugator head 11 must be rebalanced immediately.

Similarly, the display apparatus can, in a known manner, display for example the state of the hollow shaft bearings 19 by way of visual or acoustic signals, for example by way of a red flashing light, for hollow shaft bearings 19 that should be replaced immediately.

The vibration measured values, evaluation results and other data, for example the date on which the hollow shaft bearings were last changed, can be stored, transmitted and processed further for further use by means of a data-processing installation.

The invention claimed is:

1. An apparatus for impressing a corrugation into a metallic smooth pipe having a corrugating device through which the pipe is moved in a longitudinal direction of the pipe and which produces the corrugation in the circumferential direction of the pipe by rotation, said corrugating device comprising:
   a corrugator head rotatable about an axis of the head;
   a hollow shaft on which the corrugator head is firmly fitted and the corrugator head being drivable in rotation on said hollow shaft, said hollow shaft being mounted rotatably on hollow-shaft bearings; and
   a vibration measuring means fitted on the apparatus and mechanically connected to the corrugating device by means of a direct mechanical connection to the corrugator head and to the hollow shaft, wherein the direct mechanical connection is a rib that holds the corrugating device in a housing, wherein the vibration measuring means is fitted on the outside of the housing in a direction of an axis of the rib,
   wherein the vibration measuring means is suitable for automatically detecting mechanical vibrations of the rotating corrugating device and
   for simultaneously detecting measured values for vibrations of the hollow shaft caused by the hollow shaft bearings and measured values for vibrations of the corrugator head caused by balancing thereof, and
   wherein a display apparatus is coupled to the vibration measuring means for displaying the measured values detected thereby and/or evaluation results based on the measured values is provided.

2. Apparatus according to claim 1, wherein the vibration measuring means is an acceleration sensor.

3. Apparatus according to claim 1, wherein a monitoring unit is included in or attached to the apparatus, said monitoring unit delivering the evaluation results based on the vibration measured values and being suitable for establishing whether the corrugating device is operational.

* * * * *